United States Patent [19]

Bjornholt et al.

[11] 4,447,907

[45] May 8, 1984

[54] MULTIPLE MIXER SPREAD SPECTRUM MODULATION AND METHOD THEREFOR

[75] Inventors: John E. Bjornholt; Richard G. Foster, both of Mesa; Edward J. Groth, Jr., Scottsdale, all of Ariz.

[73] Assignee: Motorola Inc., Schaumburg, Ill.

[21] Appl. No.: 338,782

[22] Filed: Jan. 11, 1982

[51] Int. Cl.³ .................................. H04B 15/00
[52] U.S. Cl. ............................... 375/1; 375/55
[58] Field of Search ............ 375/1, 2.1, 2.2, 55, 375/115; 370/18, 19, 21

[56] References Cited

U.S. PATENT DOCUMENTS 3,305,636  2/1967  Webb ............................. 375/1
4,288,750  9/1981  Newton et al. ................. 375/1

Primary Examiner—Benedict V. Safourek
Attorney, Agent, or Firm—Raymond J. Warren; Eugene A. Parsons

[57] ABSTRACT

A spread spectrum modulator and a method therefor wherein a plurality of binary code generators each being at the same fraction of a desired modulation frequency and all being at equal relative phase angles are used to serially bi-phase modulate an unspread carrier signal.

6 Claims, 6 Drawing Figures

MULTIPLE MIXER SPREAD SPECTRUM MODULATION AND METHOD THEREFOR

BACKGROUND OF THE INVENTION

The present invention relates to spread spectrum modulation and methods therefor, and in particular to spread spectrum modulation employing multiple code generators and multiple mixers.

In certain covert communications systems it is desirable to spread a signal into a wide band that looks like noise. Such spreading can be accomplished by the use of a bi-phase modulator which splits a carrier signal into segments and alters the phase of each segment in response to a binary signal received from a pseudo-random bit sequence code generator. The response to the bit sequence is such that a logic zero level bit causes an in-phase carrier signal and a logic one level bit changes the phase of the carrier signal by 180°.

The greater the frequency with which bits are supplied by the binary code generator, called the code clock frequency, the greater is the spreading of signal frequency that results. Therefore, the highest possible code clock frequency is the most desirable clock frequency to employ from the standpoint of spreading the power of a signal over a range of frequencies so that the signal resembles noise. Unfortunately, high speed code generators are difficult and expensive to achieve.

SUMMARY OF THE INVENTION

Accordingly it is an object of the present invention to provide a new and improved system for spread spectrum modulation.

It is a further object of the present invention to provide a new and improved system for spread spectrum modulation wherein a high code bit frequency is obtainable despite the use of a code clock having a lower frequency.

Yet another object of the present invention is to provide a method for spread spectrum modulation that produces a code bit frequency higher than the provided code clock frequency.

Among the advantages of the present invention are the extremely wide bandwidth of the spread signal and the extreme suppression of unwanted spurious signals.

In order to attain the above mentioned and other objects and advantages the present invention comprises a plurality of serially coupled spectrum spreading units, each of which comprises a bi-phase modulator and at least one code generator, and means for phasing said spreading units coupled to each of said plurality of spreading units. The method of the present invention comprises steps of generating a plurality of code signals, phasing said plurality of code signals, and serially modulating the carrier signal with said plurality of code signals.

These and other objects and advantages of the present invention will become apparent to those skilled in the art upon consideration of the accompanying specification, claims and drawings.

BRIEF DESCRIPTION OF THE DRAWINGS

FIGS. 5A through I and 5L are representative of signals present at various points within the embodiment of FIG. 3 while FIGS. 5J, 5K and 5M are diagram representative of the effect of those signals upon the carrier signal at various points in the embodiment of FIG. 3.

DESCRIPTION OF THE PREFERRED EMBODIMENT

Figure 1:
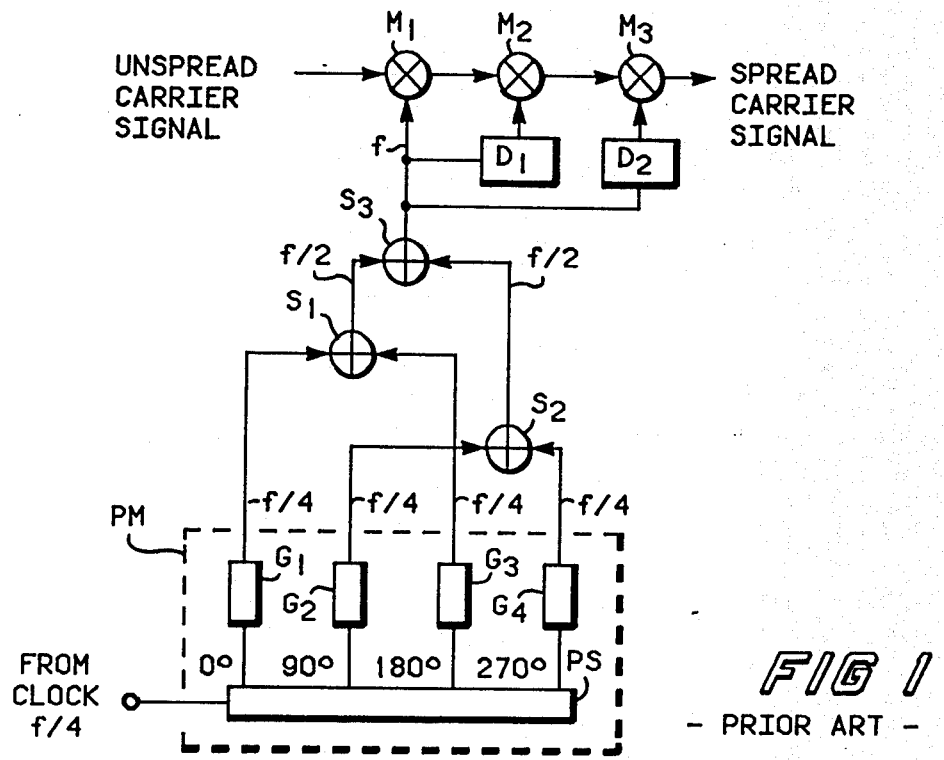
FIG. 1 is a simplified block diagram of a prior art device for spread spectrum modulation.

One approach to obtaining a bit rate higher than clock rate involves using a plurality of clock signals each at a rate of R/P and each phase-shifted by 360°/P where R is the desired output code bit frequency and P is the rate reduction desired. For example, FIG. 1 illustrates a system in which a clock signal at a rate of $\frac{1}{4}$ that of the desired frequency of f is phase shifted and split into four signals spaced 90° apart by device PS. Each shifted signal is fed into a separate code generator, $G_1$ through $G_4$. Outputs of generators separated by 180° in phase are combined in half-adders $S_1$ and $S_2$ which act as exclusive-OR gates. The output signals of half-adders $S_1$ and $S_2$ are each at a frequency of f/2 but 90° out of phase with one another so that when these two outputs are combined in half adder $S_3$, the resulting output is at the desired rate of f.

Figure 2:
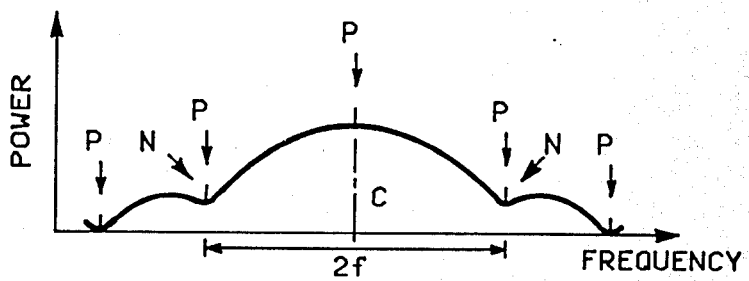
FIG. 2 is a spectral density curve representative of the output of the prior art device of FIG. 1.

By applying the output signal from half adder $S_3$ to an unspread carrier signal in a bi-phase modulator $M_1$, the result is a relationship of power of the carrier signal to frequency of the carrier signal as shown in FIG. 2. This result is similar to that obtained when a single clock signal at a rate of f is used. Although the power of the carrier signal has been spread from an unspread carrier frequency C into a band having a width equal to twice the code bit frequency applied to modulator $M_1$, undesirable components P result from imperfections in the circuit elements used. One approach to suppressing spurious peaks P involves passing the spread carrier signal from the output of modulator $M_1$ through a tandem arrangement of a plurality of additional modulators, for example $M_2$ and $M_3$, and through the delays necessary to provide appropriate modulating signals, $D_1$ and $D_2$, as shown in FIG. 1.

It is usual to require that the carrier and other signals, such as the code clock, be greatly suppressed in the final spectrum. It is usual that a modulator, at microwave frequencies, provides a net carrier suppression of perhaps about 20 dB below the unspread carrier signal. It is also usual that a clock signal which arises from code generation and appears spectrally at the null frequencies, for example, at first null N as shown in FIG. 2, will not be suppressed much more than the carrier.

Figure 3:
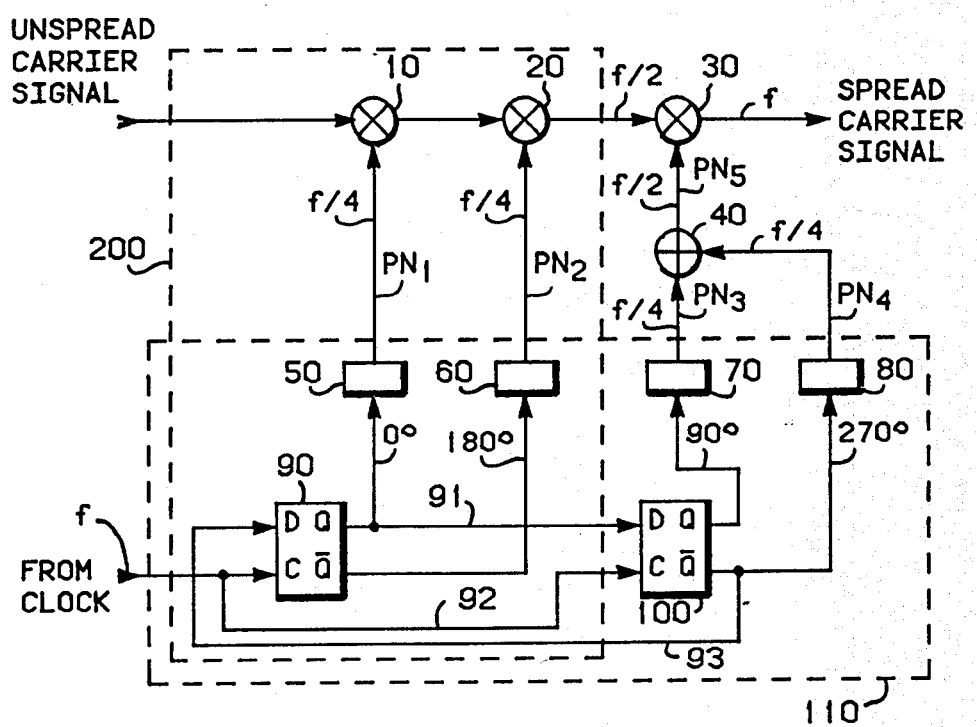
FIG. 3 is a simplified block diagram of a spread spectrum modulation system embodying the present invention.

Referring now to FIG. 3, a preferred embodiment for quadrupling the bit frequency of the available code generator is shown. A bi-phase modulator 10 has an input for receiving an unspread carrier signal and an input coupled to an output of a code generator 50. Generator 50 is coupled in turn to the Q output of a type D flip-flop 90. Flip-flop 90 receives a clock signal at its input C and receives a second signal at its D input from the $\overline{Q}$ output of a type D flip-flop 100. The $\overline{Q}$ output of flip-flop 90 is coupled to an input of a code generator 60. The output of code generator 60 is coupled to an input of a bi-phase modulator 20, which also receives an input from bi-phase modulator 10. An output of modulator 20 is coupled to an input of a bi-phase modulator 30, which has another input coupled to the output of a half adder 40.

One input of half adder 40 is coupled to the output of a code generator 70, the input of which is coupled to the Q output of type D flip-flop 100. At its D input, flip-flop 100 is coupled to the Q output of flip-flop 90, while at its C input, flip-flop 100 is coupled to the clock. The $\overline{Q}$ output of flip-flop 100 is coupled to an input of code generator 80, which has an output coupled to another input of half adder 40. Modulator 30 has an output for providing a spread carrier signal.

Figure 4:
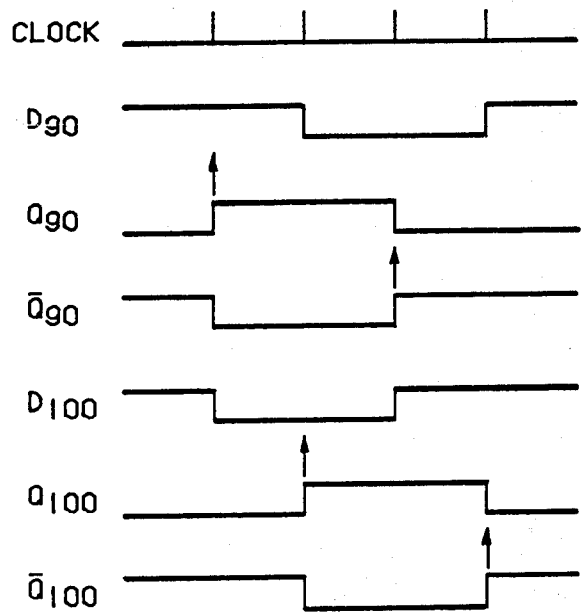
FIG. 4 is a set of waveforms representative of the relationship between pulses found at various points in the embodiment of FIG. 3.

In the operation of type D flip-flops 90 and 100, when the C input receives a clock pulse, the D input is at the state of the signal applied to it, the Q output is shifted to the state of the D input, and the $\overline{Q}$ is shifted to the state opposite to that of the Q output. A typical set of pulses produced by flip-flops 90 and 100 is illustrated in FIG. 4 for four clock pulses with outputs to the code generators being indicated by arrows. As noted in FIG. 3 the Q and $\overline{Q}$ outputs of flip-flop 90 are 180° out of phase as are the Q and $\overline{Q}$ outputs of flip-flop 100. Further, the Q and $\overline{Q}$ outputs of flip-flop 100 are respectively 90° and 270° out of phase with respect to the Q output of flip-flop 90. Although the means for providing phased clock signals for the preferred embodiment has been described as a combination of flip-flops 90 and 100, it will be understood by those skilled in the art that many sources for phase shifted clock systems could be devised without affecting the essential features and function of the present invention.

The properly phased clock signals from flip-flops 90 and 100 are applied to the inputs of code generators 50, 60, 70 and 80. It will be understood by those skilled in the art that each of these four generators may be a pseudo-random bit sequence generator such as may comprise a shift register the stages of which have clock inputs, two or more stages of which may provide input signals to a modulo 2 adder the output of which may be applied to the first stage of the shift register, the output of the last stage of which provides a binary pseudo-random bit sequence.

Thus, a phase-coded signal source 110, like phase-coded signal source PM in FIG. 1, provides for evenly-spaced code sequences each at a code clock frequency of f/4. However, instead of combining pairs of these sequences in an arrangement of half adders as shown in FIG. 1, the code sequences are serially used to bi-phase modulate the carrier signal as depicted in FIG. 3. For the preferred embodiment of FIG. 3 where it is desired to spread the carrier into a band having a width of 2 f, a code sequence $PN_1$ from code generator 50 having a frequency f/4, is used to bi-phase modulate the unspread carrier signal in bi-phase modulator 10. By modulating the output of bi-phase modulator 10 in bi-phase modulator 20 using a code sequence $PN_2$ supplied by code generator 60, a spreading equivalent to modulation by the code sequence having a frequency of f/2 is obtained. By applying code sequences $PN_3$ and $PN_4$ to half adder 40, a code sequence $PN_5$ is obtained at frequency f/2. Code sequence $PN_5$ is used to bi-phase modulate the output signal from bi-phase modulator 20 to produce a signal having a spread equivalent to that attainable by the use of a single code sequence at a frequency of f.

Figure 5:
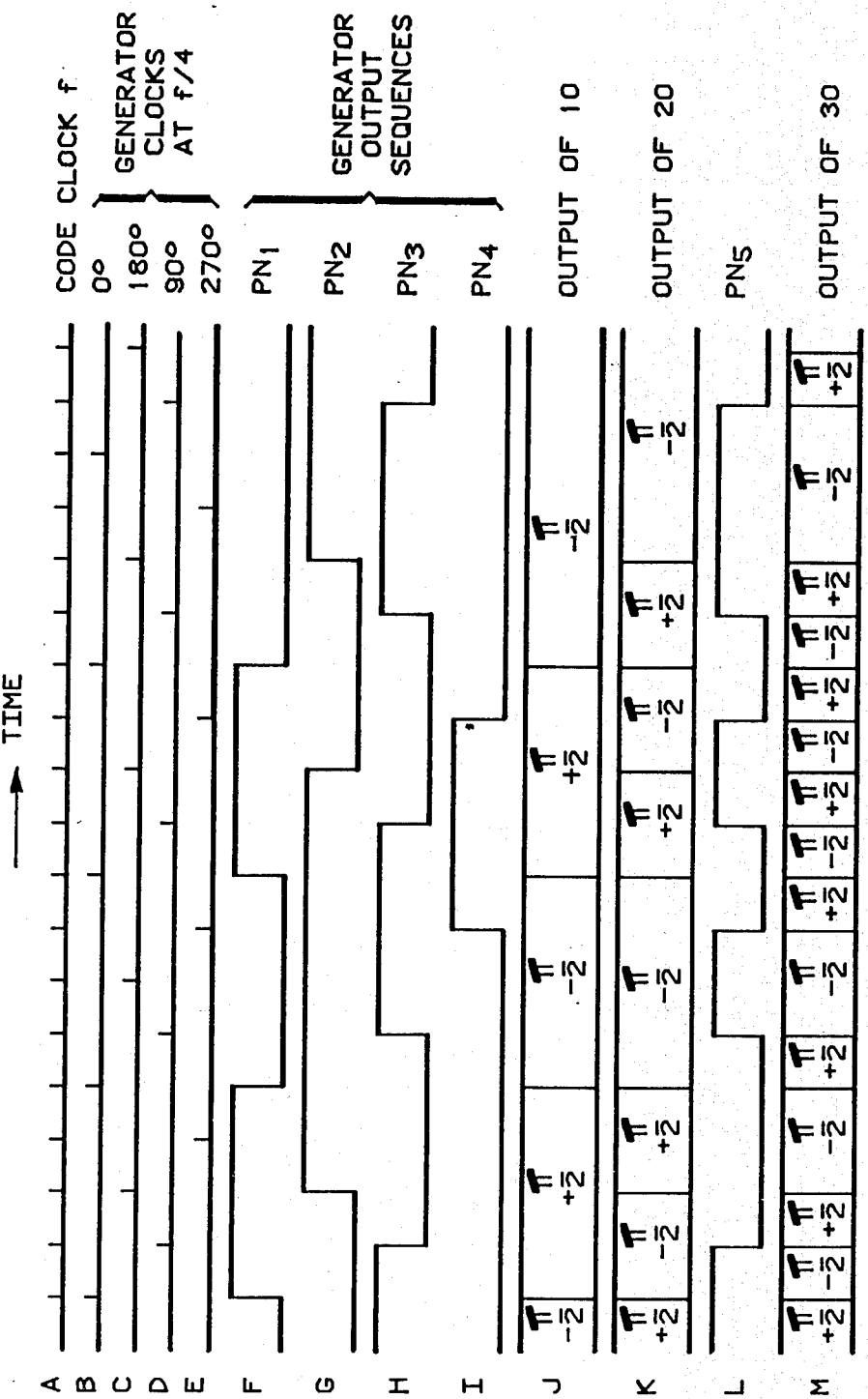

The method employed in the apparatus of FIG. 3 can be understood by the inspection of FIG. 5. In FIG. 5A the desired code clock at frequency f is illustrated next to FIGS. 5B through E which show the four phased generator clocks produced by flip-flops 90 and 100 from a clock signal having a frequency of f. By applying the generator clocks of FIGS. 5B through E to typical embodiments of code generators 50, 60, 70 and 80, the exemplary generator output sequences shown in FIG. 5F through I, respectively, are produced. The effect upon the unspread carrier of applying the code sequence of FIG. 5F is shown in FIG. 5J. The result of serially applying the code sequency of FIG. 5G to the output of bi-phase modulator 10 in bi-phase modulator 20 is shown in FIG. 5K. Code sequence $PN_5$, as shown in FIG. 5L, is the exclusive OR sum of code sequences of FIGS. 5H and 5I. The result of the application of the code sequence of FIG. 5L to the output of bi-phase modulator 20 in bi-phase modulator 30 is shown in FIG. 5M with each segment in FIGS. 5J, 5K and 5M representing the phase relative to the phase of the unspread carrier signal.

Figure 6:
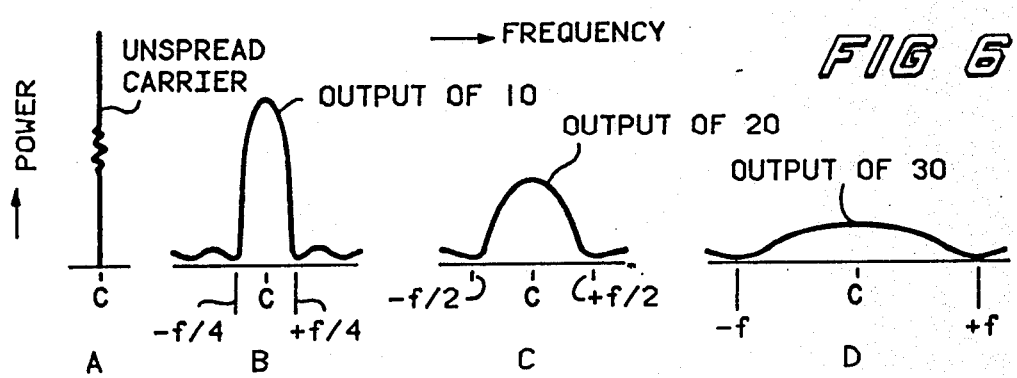
FIGS. 6A through D are spectral density curves representative of the carrier signal at various points in the embodiment of FIG. 3.

Because of the 180° phase difference between the clocking signal supplied to generator 50 and the clocking signal supplied to generator 60, output sequences $PN_1$ and $PN_2$ are staggered by one-half of a code symbol at the clock rate of f/4. With reference to the unspread carrier at frequency C a shown in FIG. 6A, sequence $PN_2$ is used to produce bi-phase modulation in modulator 20 of the output from modulator 10, which is shown in FIG. 6B. The result is that the output signal from bi-phase modulator 20, as shown in FIG. 6C, is a spread spectrum signal with first nulls at $2 \times f/4$ or f/2 on each side of the suppressed carrier frequency. The spread bandwidth at the output of modulator 10 has been doubled at the output of modulator 20 because of the half symbol stagger of the two modulating codes, $PN_1$ and $PN_2$.

The exclusive-OR sum, $PN_5$, of the outputs of generator 70 and 80 has an effective clock rate of $2 \times f/4$ or f/2. Also, the effective clock of $PN_5$ is staggered one-half symbols with respect to the effective clock on the modulation of the spread spectrum signal supplied to modulator 30 by modulator 20. Therefore, the spread bandwidth is doubled again to produce a spread spectrum signal with first nulls at f on each side of these suppressed carrier signals, as shown in FIG. 6D.

It is usual for a mixer at microwave frequencies to provide a net carrier suppression of about 20 dB below the unspread carrier signal. It is also usually the case that the code clock, which appears at the null frequencies, is not suppressed much more than the carrier. In the present invention, by providing a plurality of coded signals at equal relative phase angles and by serially modulating the carrier signal with these coded signals rather than combining a plurality of coded signals to modulate the carrier in a single step, the undesired spurious signals which appear in the spectrum of the signal at the output of modulator 10 are spread by the modulation in modulator 20, and the result is a suppression of the spurious signals by the product of the amounts from each of the mixers. Hence, a spread carrier signal at the output of modulator 20 will have a net suppression by at least 40 dB with clock signals being suppressed even further. The same sort of suppression takes place in modulator 30 with even increased suppression of all spurious signals.

While the present invention has been described in terms of a preferred embodiment, further modifications and improvements will occur to those skilled in the art. For example, it is obvious to one skilled in the art to modify the present invention to operate with a supplied code clock operating at any particular fraction of the desired frequency for modulation. Such a modification could be accomplished for a code clock at f/8, for example, by: (1) providing 8 code sequences staggered at 8 equal relative phase angles, each having a clock rate of f/8; (2) modulating an unspread carrier signal with the 0° phased signal; (3) phase modulating the result using the 180° phased signal then by phase modulating that result using the exclusive-OR sum of the 90° and 270° phased signal; and (4) modulating the output of the third bi-phase modulator using an excusive-OR sum of the respective exclusive-OR sums of the 45° and 225° code sequences and the 135° and 315° code sequences. In this and further even multiple extensions of the preferred embodiment it is clear to one skilled in the art that the number of code generators providing input to any modulator is one for the first modulator and $2^N$, N being the inclusive number of modulators from the beginning of the chain of modulators minus 2, for each succeeding modulator, and that the number of exclusive OR gates between a plurality of code generators and the modulator is $2^{(N-2)}-1$. Therefore, it is evident that a structure 200 as shown in FIG. 3, if modified by eliminating paths 91, 92 and 93 and by coupling the D input of flip-flop 90 to the $\overline{Q}$ output of flip-flop 90, is a basis upon which all such other even multiple extensions are elaborated.

It is also clear to one skilled in the art that the present invention may be said to comprise serially linked spectrum spreading units, each spectrum spreading unit further comprising a modulator having an input coupled to at least one code generator, said spectrum spreading units being supplied with an appropriately phased clock signal. In this regard, it is clear to one skilled in the art that the present invention is not limited to even multiples of a clock frequency but rather extends to producing a spreading equivalent to the effect of any multiple of a code clock frequency as long as the number of mixing steps is appropriate (eg. three serially coupled modulators, each having an input code sequence at a frequency of f/3). We desire it to be understood, therefore, that this invention is not limited to the particular form shown and we intend in the appended claims to cover all such equivalent variations which come within the scope of the invention as described.

We claim:

1. An apparatus for spread spectrum modulation of a signal comprising:
   a plurality of spectrum spreading units coupled in series, each spectrum spreading unit comprising, a signal input, a signal output, a phase input, at least one code generator having an output and having an input coupled to said phase input, and a modulator having a first input coupled to said signal input, having a second input coupled to said output of said code generator, and having an output coupled to said signal output, said spreading units being linked signal output to signal input to form a series of units, a signal input at the beginning of said series receiving the unspread signal and a signal output at the end of said series supplying the spread signal; and
   means for providing a phased clock signal to said spreading units coupled to said phase input of each of said plurality of spreading units to clock each of said units at a different relative phase angle.

2. The apparatus for spread spectrum modulation as recited in claim 1 wherein said spreading unit at the beginning of said chain comprises one code generator and each succeeding signal spreading unit in sequence comprises a number of code generators equal to $2^N$, N being the inclusive number of modulators from said beginning of said chain minus 2.

3. The apparatus for spread spectrum modulation as recited in claim 2 wherein spectrum spreading units having more than one code generator further comprise $2^{(N-2)}-1$ exclusive-OR gates, said exclusive-OR gates being arrayed in levels of descending powers of 2 in number between said outputs of said code generators and said input of said modulator.

4. An apparatus for spread spectrum modulation from an unspread state to a spread state comprising:
   a clock input;
   a first flip-flop having a first input coupled to said clock input, having a second input, having a first output, and having a second output;
   a second flip-flop having a first input coupled to said clock input, having a second input coupled to said first output of said first flip-flop, having a first output and having a second output coupled to said second input of said first flip-flop;
   a first code generator having an output and having an input coupled to said first output of said first flip-flop;
   a second code generator having an output and having an input coupled to said second output of said first flip-flop;
   a third code generator having an output, and having an input coupled to said first output of said second flip-flop;
   a fourth code generator having an output and having an input coupled to said second output of said second flip-flop;
   an exclusive-OR gate having an output, having a first input coupled to said output of said third code generator, and having a second input coupled to said output of said fourth code generator;
   a first bi-phase modulator having an output, having a first input for receiving the signal in the unspread state, and having a second input coupled to said output of said first code generator;
   a second bi-phase modulator having an output, having a first input coupled to said output of said first bi-phase modulator, and having a second input coupled to said output of said second code generator; and
   a third bi-phase modulator having an output for transmission of the carrier in the spread state, having a first input coupled to said output of said second bi-phase modulator, and having a second input coupled to said output of said exclusive-OR gate.

5. The apparatus for spread spectrum modulation as recited in claim 4 wherein said code generators comprise linear shift register feedback generators producing binary coding sequences.

6. A method of modulating an unspread signal to obtain a spread spectrum signal comprising the steps of;
   providing a plurality of phased coded signals;

serially modulating said unspread signal with a first portion of said plurality of coded signals creating a partially unspread signal;

combining a subsequent portion of said plurality of coded signals through a sequence of logic gates creating a resulting coded signal; and serially modulating said partially unspread signal with said resulting coded signals.

* * * * *